(12) United States Patent
Ponugoti et al.

(10) Patent No.: US 12,745,095 B2
(45) **Date of Patent: *Sep. 22, 2026**

(54) DYNAMIC RADIO ACCESS TECHNOLOGY BANDWIDTH ADAPTATION ACROSS ASYMMETRIC DSS NETWORKS

(71) Applicant: T-Mobile Innovations LLC, Overland Park, KS (US)

(72) Inventors: Rishitha Ponugoti, Kirkland, WA (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 715 days.

This patent is subject to a terminal disclaimer.

(21) Appl. No.: 17/533,396

(22) Filed: Nov. 23, 2021

(65) Prior Publication Data

US 2023/0164575 A1 May 25, 2023

(51) Int. Cl.
*H04W 16/14* (2009.01)
*H04W 28/16* (2009.01)

(52) U.S. Cl.
CPC .......... *H04W 16/14* (2013.01); *H04W 28/16* (2013.01)

(58) Field of Classification Search
CPC ...... H04W 16/14; H04W 28/16; H04W 88/10
See application file for complete search history.

(56) References Cited

U.S. PATENT DOCUMENTS 11,696,146 B1 7/2023 Viorel et al.
11,700,535 B1 * 7/2023 Polaganga ............ H04W 16/04 370/329
2021/0266753 A1 * 8/2021 Kumar ............. H04W 28/0252
2023/0076738 A1 3/2023 Dhanapal et al.

OTHER PUBLICATIONS

Barb G, Alexa F, Otesteanu M. Dynamic Spectrum Sharing for Future LTE-NR Networks. Sensors (Basel). Jun. 19, 2021;21(12): 4215. doi: 10.3390/s21124215. PMID: 34205459; PMCID: PMC8235763. (Year: 2021).*

Non-Final Office Action received for U.S. Appl. No. 17/534,067, mailed on Jun. 13, 2024, 7 pages.

Final Office Action received for U.S. Appl. No. 17/534,067, mailed on Feb. 12, 2025, 11 pages.

Final Office Action received for U.S. Appl. No. 17/534,067, mailed on Jun. 11, 2025, 12 pages.

Notice of Allowance received for U.S. Appl. No. 17/534,067, mailed on Oct. 16, 2025, 7 pages.

* cited by examiner

*Primary Examiner* — Justin T Van Roie
(74) *Attorney, Agent, or Firm* — Shook, Hardy & Bacon L.L.P.

(57) ABSTRACT

System and method are provided for a dynamic radio access technology (RAT) bandwidth adaptation across asymmetric dynamic spectrum sharing (DSS) networks. DSS is implemented for Long Term Evolution (LTE) in 4G and New Radio (NR) in 5G. When the traffic usage for one radio access technology (LTE or NR) exceeds its bandwidth capacity, the radio network node adjust the bandwidth by a pre-defined step to accommodate the increased traffic usage (Continued)

of the radio access technology. The bandwidth of the corresponding radio access technology that shares the DSS is reduced. The expansion and reduction in bandwidths for the radio access technologies with DSS is designed to reduce interference.

14 Claims, 3 Drawing Sheets

DYNAMIC RADIO ACCESS TECHNOLOGY BANDWIDTH ADAPTATION ACROSS ASYMMETRIC DSS NETWORKS

CROSS-REFERENCE TO RELATED APPLICATIONS

None.

BACKGROUND

To overcome interference challenges observed with symmetric dynamic spectrum sharing (DSS) solution, operators are exploring asymmetric DSS solutions in which both Long Term Evolution (LTE) and New Radio (NR) can have different carrier bandwidths. Current implementation is to define shared bandwidth portion manually and does not have the flexibility to dynamically expand and reduce this shared bandwidth portion within the larger bandwidth depending on varying traffic profiles.

Consider a band-X with contiguous 30 megahertz (MHz) bandwidth with NR cell defined for the entire bandwidth while 10 MHz is being used as shared DSS cell for both LTE and NR users. If LTE traffic usage gradually increases and congests the entire 10 MHz bandwidth while the 30 MHz bandwidth is underutilized, there is no mechanism to dynamically expand the LTE bandwidth inside the 30 MHz band-X. Similarly, if LTE shared 10 MHz bandwidth is significantly underutilized while NR traffic is high, it would be ideal to reduce the LTE bandwidth to minimize interference and improve NR throughputs.

SUMMARY

A method and system are provided to dynamically expand and reduce certain DSS shared radio access technology (RAT) bandwidth based on traffic usages. LTE and NR can share contiguous spectrum in an intra band scenario. When the bandwidth of LTE or NR exceeds a threshold, the bandwidth can be incrementally increased by a pre-defined amount, especially when the corresponding bandwidth of the adjacent technology (ie. the adjacent NR or LTE in DSS) is being underutilized. Also, when the bandwidth of LTE or NR is underutilized, the bandwidth can be incrementally reduced by a pre-defined amount, especially when the corresponding bandwidth of the adjacent technology in DSS is exceeding its bandwidth threshold.

BRIEF DESCRIPTION OF THE DRAWINGS

Illustrative embodiments of the present invention are described in detail below with reference to the attached drawing figures, and wherein.

DETAILED DESCRIPTION

Figure 1:
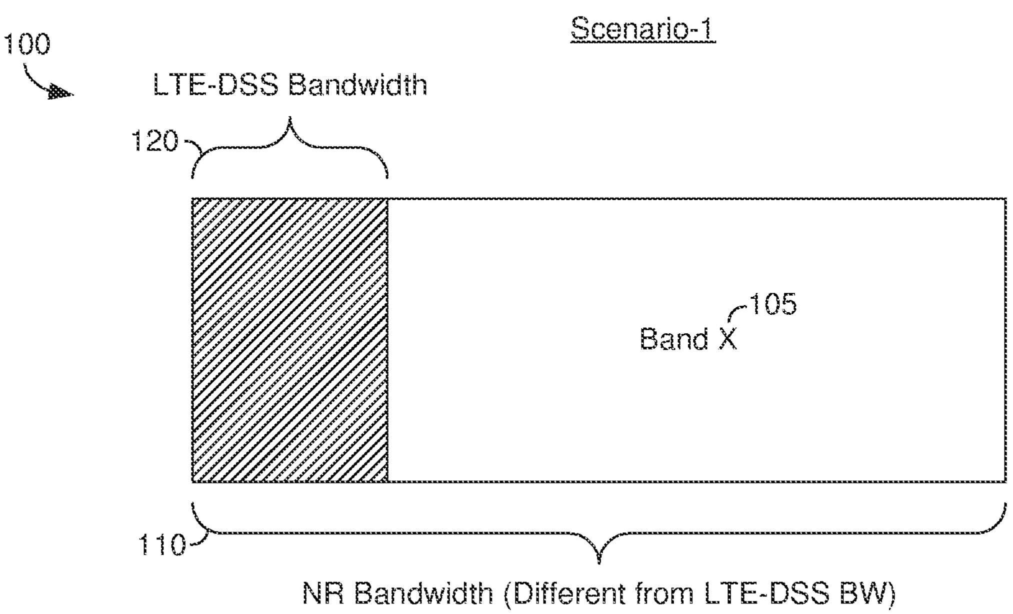
FIG. 1 is an illustration of dynamic spectrum sharing in band-X where New Radio (NR) bandwidth shares spectrum with Long Term Evolution (LTE) bandwidth, according to an implementation of an embodiment of the present invention.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 5GCN | 5G Core Network |
| BS | Base Station |
| BTS | Base Transceiver Station |
| CDMA | Code Division Multiple Access |
| CDMA2000 | Code Division Multiple Access 2000 |
| DSS | Dynamic Spectrum Sharing |
| eNodeB or eNB | Evolved Node B |
| gNB or gNodeB | Next Generation Node B |
| GPRS | General Packet Radio Service |
| GSM | Global System for Mobile communications |
| IP | Internet Protocol |
| LTE | Long Term Evolution |
| MD | Mobile Device |
| ME | Mobile Equipment |
| ng-eNB | Next Generation Evolved Node B |
| NR | New Radio |
| OS | Operating System |
| PC | Personal Computer |
| PCS | Personal Communications Service |
| RAT | Radio Access Technology |
| RF | Radio-Frequency |
| RFI | Radio-Frequency Interference |
| SIM | Subscriber Identity Module |
| TDMA | Time Division Multiple Access |
| UE | User Equipment |
| UMTS | Universal Mobile Telecommunications Service |
| WCDMA | Wideband Code Division Multiple Access |
| WiMAX | Worldwide Interoperability for Microwave Access |

Further, various technical terms are used throughout this description.

In a first aspect, a method and system of dynamically changing a radio access technology (RAT) bandwidth based on traffic usage is provided that includes operating dynamic spectrum sharing (DSS) in a mobile communications network that includes a first wireless standard technology and a second wireless standard technology. A radio network node is configured to operate and monitor traffic usage in a first RAT and a second RAT. The first RAT operates in the first wireless standard technology and the second RAT operates in the second wireless standard technology. The first RAT is configured to operate with a first bandwidth larger than the second RAT that is configured to operate with a second bandwidth. The first RAT and the second RAT are configured to operate with DSS for a particular band. The radio network node is configured to expand the second bandwidth of the second RAT by a pre-defined amount when a second RAT utilization is higher than a second operator-defined threshold and a first RAT utilization is lower than a first operator-defined threshold. The radio network node is configured to reduce the second bandwidth of the second RAT by the pre-defined amount when the second RAT utilization is lower than the second operator-defined threshold and the first RAT utilization is higher than the first operator-defined threshold.

In a second aspect, a method of dynamically changing a radio access technology (RAT) bandwidth based on traffic usage is provided that includes operating dynamic spectrum sharing (DSS) in a mobile communications network that includes 4G wireless technology and 5G wireless technology. A radio network node monitors traffic usage in Long Term Evolution (LTE) and New Radio (NR) and configures bandwidths for LTE and NR. LTE operates in 4G wireless technology and NR operates in 5G wireless technology. NR operates with a first bandwidth larger than LTE, which operates with a second bandwidth, where NR and LTE operate with DSS for a particular band. Or, NR operates with the first bandwidth smaller than LTE, which operates with the second bandwidth, where NR and LTE operate with DSS for the particular band. When NR has a larger assigned bandwidth than LTE, the second bandwidth of LTE is expanded by a pre-defined amount when a LTE utilization is higher than a LTE operator-defined threshold and a NR utilization is less than a NR operator-defined threshold. Also, when NR has a larger assigned bandwidth than LTE, the second bandwidth of LTE is reduced by the pre-defined amount when the LTE utilization is less than the LTE operator-defined threshold and the NR utilization is higher than the NR operator-defined threshold. When NR has a smaller assigned bandwidth than LTE, the first bandwidth of NR is expanded by a pre-defined amount when the NR utilization is higher than the NR operator-defined threshold and the LTE utilization is less than the LTE operator-defined threshold. Also, when NR has a smaller assigned bandwidth than LTE, the first bandwidth of NR is reduced by the pre-defined amount when the NR utilization is less than the NR operator-defined threshold and the LTE utilization is higher than the LTE operator-defined threshold.

In FIG. 1, a graph 100 illustrates LTE and NR functioning in a shared radio access technology bandwidth. Particularly, graph 100 is an illustration of the assignment of bandwidth for New Radio (NR) 110 in 5G wireless technology and Long Term Evolution (LTE) 120 in 4G wireless technology. The actual assignment of bandwidth occurs in either an eNodeB, gNB, or ng-eNB, which are the radio access technology devices used to connect cellular wireless devices back to a core network. As one can see in graph 100, LTE shares bandwidth with NR, and this shared bandwidth is referred to as dynamic spectrum sharing (DSS). For example, NR 110 could have a bandwidth of 30 MHz and LTE 120 could have a bandwidth of 10 MHz. The DSS would be that portion of 10 MHz shared between NR and LTE. This sharing of bandwidth enables an operator to have both 4G LTE users and 5G NR users operate in a same band-X 105.

In an implementation of an embodiment of the present invention, the bandwidth of NR 110 and LTE 120 can dynamically be adjusted to accommodate changes in traffic usage for 5G NR users and 4G LTE users. This can occur when there is a contiguous bandwidth spectrum in an intra band scenario. An operator configures bandwidth thresholds for NR 110 and LTE 120 in an eNodeB, gNB, or ng-eNB. For FIG. 1, when traffic usage for LTE 120 reaches the bandwidth threshold, the eNodeB, gNB, or ng-eNB checks the bandwidth for NR 110. And if the traffic usage for NR 110 is less than its allocated bandwidth threshold, the eNodeB, gNB, or ng-eNB increases the bandwidth of LTE 120 by a pre-defined amount. The increase in bandwidth can occur up to a set maximum imposed by the operator Likewise, if the traffic usage for LTE 120 is less than the bandwidth threshold set for 4G LTE users and the traffic usage for NR 110 is more than the bandwidth threshold set for 5G NR users, the eNodeB, gNB, or ng-eNB reduces the bandwidth of LTE 120 by a pre-defined amount. The decrease in bandwidth can continue to occur down to a minimum set by the operator.

Figure 2:
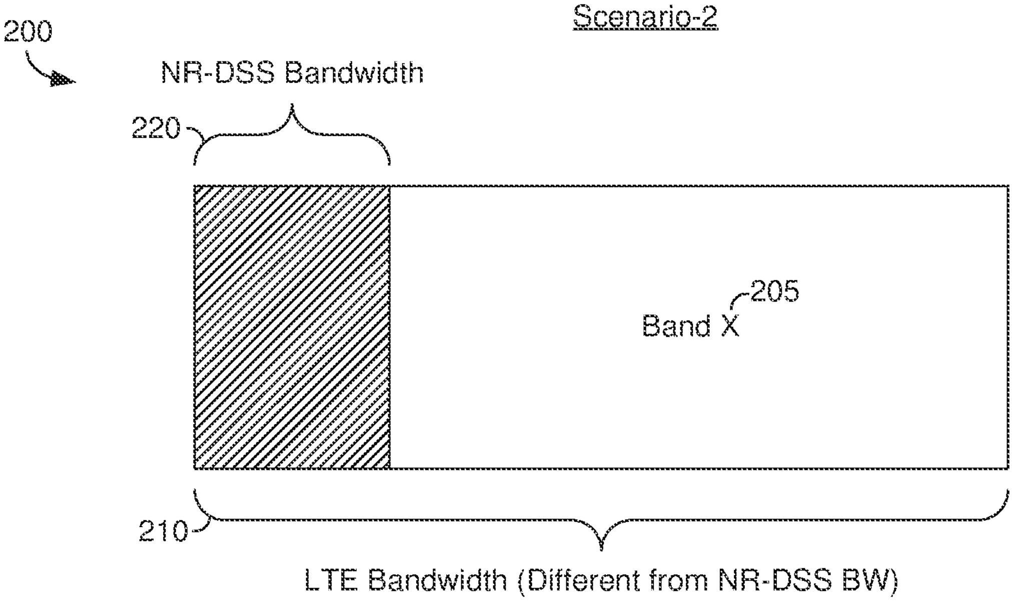
FIG. 2 is an illustration of dynamic spectrum sharing in band-X where Long Term Evolution (LTE) bandwidth shares spectrum with New Radio (NR) bandwidth, according to an implementation of an embodiment of the present invention.

Turning now to FIG. 2, a graph 200 illustrates a converse of graph 100. Graph 200 illustrates of NR and LTE functioning in a shared radio access technology bandwidth. Particularly, graph 200 is an illustration of the assignment of bandwidth for LTE 210 in 4G wireless technology and NR 220 in 5G wireless technology. As one can see in graph 200, NR shares bandwidth with LTE, in DSS. For example, LTE 210 could have a bandwidth of 30 MHz and NR 220 could have a bandwidth of 10 MHz. The DSS would be that portion of 10 MHz shared between NR and LTE. This sharing of bandwidth enables the operator to have both 4G LTE users and 5G NR users operate in a same band-X 205, similar to band-X 105.

As stated before for NR 110 and LTE 120, LTE 210 and NR 220 can dynamically be adjusted to accommodate changes in traffic usage for 4G LTE users and 5G NR users. The operator configures bandwidth thresholds for LTE 210 and NR 220, which might be slightly less than the full bandwidths shown in graph 200 in FIG. 2. For example, if LTE has a bandwidth of 30 MHz and NR 220 has a bandwidth of 10 MHz, the operator may allocate bandwidth thresholds that are less than the bandwidth maximums in order to reduce interference. Therefore, when traffic user for NR 220 reaches the bandwidth threshold, the eNodeB, gNB, or ng-eNB can check the bandwidth of LTE 210. If the traffic usage for LTE 210 is less than the allocated bandwidth threshold, the eNodeB, gNB, or ng-eNB can incrementally increase the bandwidth of NR 220 by a pre-defined amount. Likewise, if the traffic usage for NR 220 is less than the bandwidth threshold set for 5G NR users and the traffic usage for LTE 210 is more than the bandwidth threshold set for 4G LTE users, the eNodeB, gNB, or ng-eNB (or any other assigned radio access technology) can reduce the bandwidth of NR 220 by a pre-defined amount. The decrease can continue in a loop or repetitive arrangement until a minimum set by the operator is reached.

Figure 3:
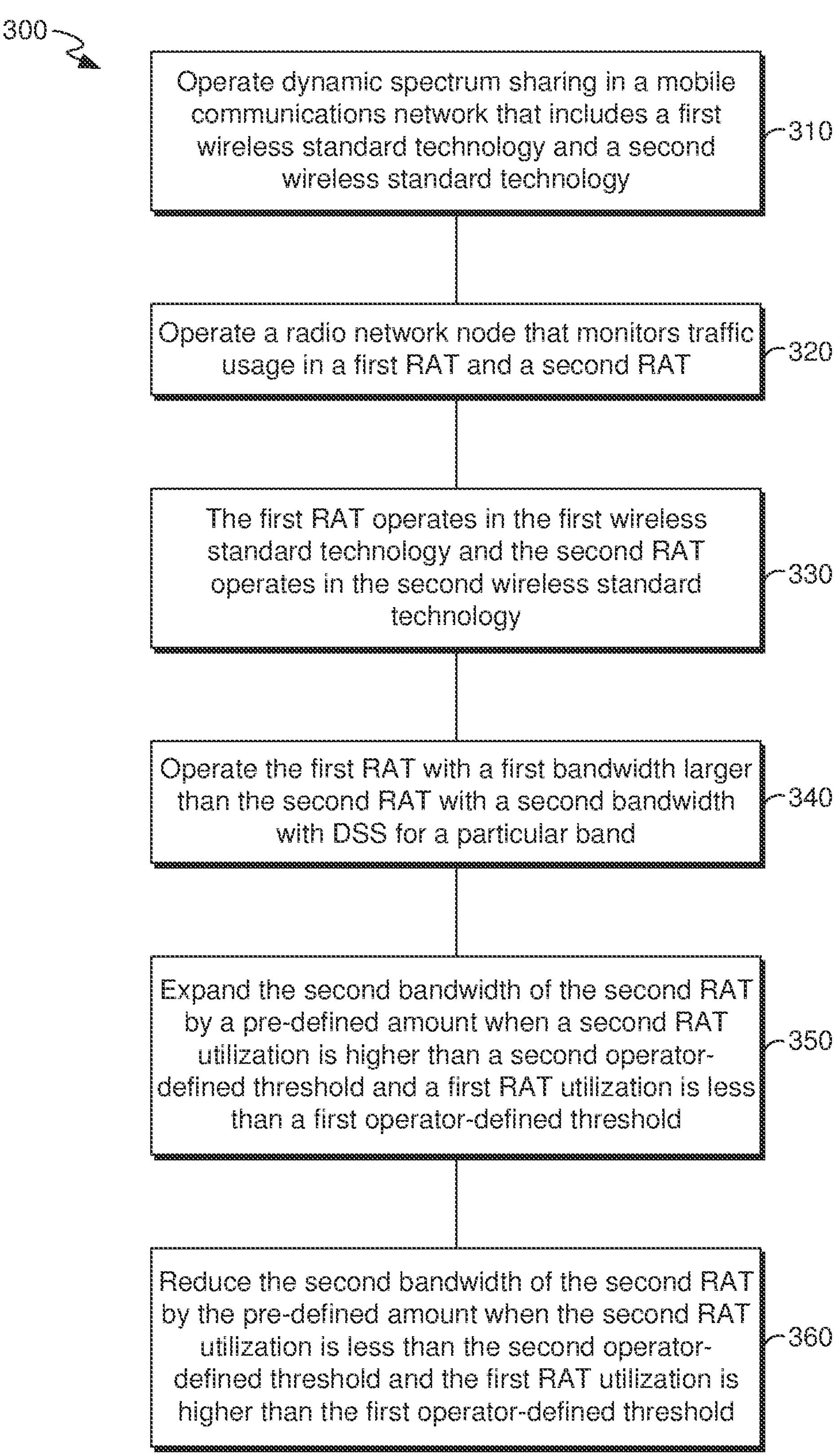
FIG. 3 illustrates a process for dynamically changing radio access technology (RAT) bandwidth based on traffic usage, according to an implementation of an embodiment of the present invention.

Turning now to FIG. 3, a method for dynamically changing radio access technology (RAT) bandwidth based on traffic usage is provided in a process 300. In a step 310, dynamic spectrum sharing (DSS) is provided in a mobile communications network that includes a first wireless standard technology and a second wireless standard technology. In a step 320, a radio network node monitors traffic usage in a first radio access technology (RAT) (e.g. NR 110, LTE 210) and a second radio access technology (RAT) (e.g. LTE 120, NR 220). The first RAT operates in the first wireless standard technology and the second RAT operates in the second wireless standard technology, in a step 330. In a step 340, the first RAT has a first bandwidth larger than the second RAT with a second bandwidth, with DSS for a particular band. In a step 350, the second bandwidth of the second RAT is expanded by a pre-defined amount when a second RAT utilization is higher than a second operator-defined threshold, and a first RAT utilization is less than a first operator-defined threshold. The second bandwidth of the second RAT is reduced by the pre-defined amount when the second RAT utilization is less than the second operator-defined threshold, and the first RAT utilization is higher than the first operator-defined threshold, in a step 360.

Figure 4:
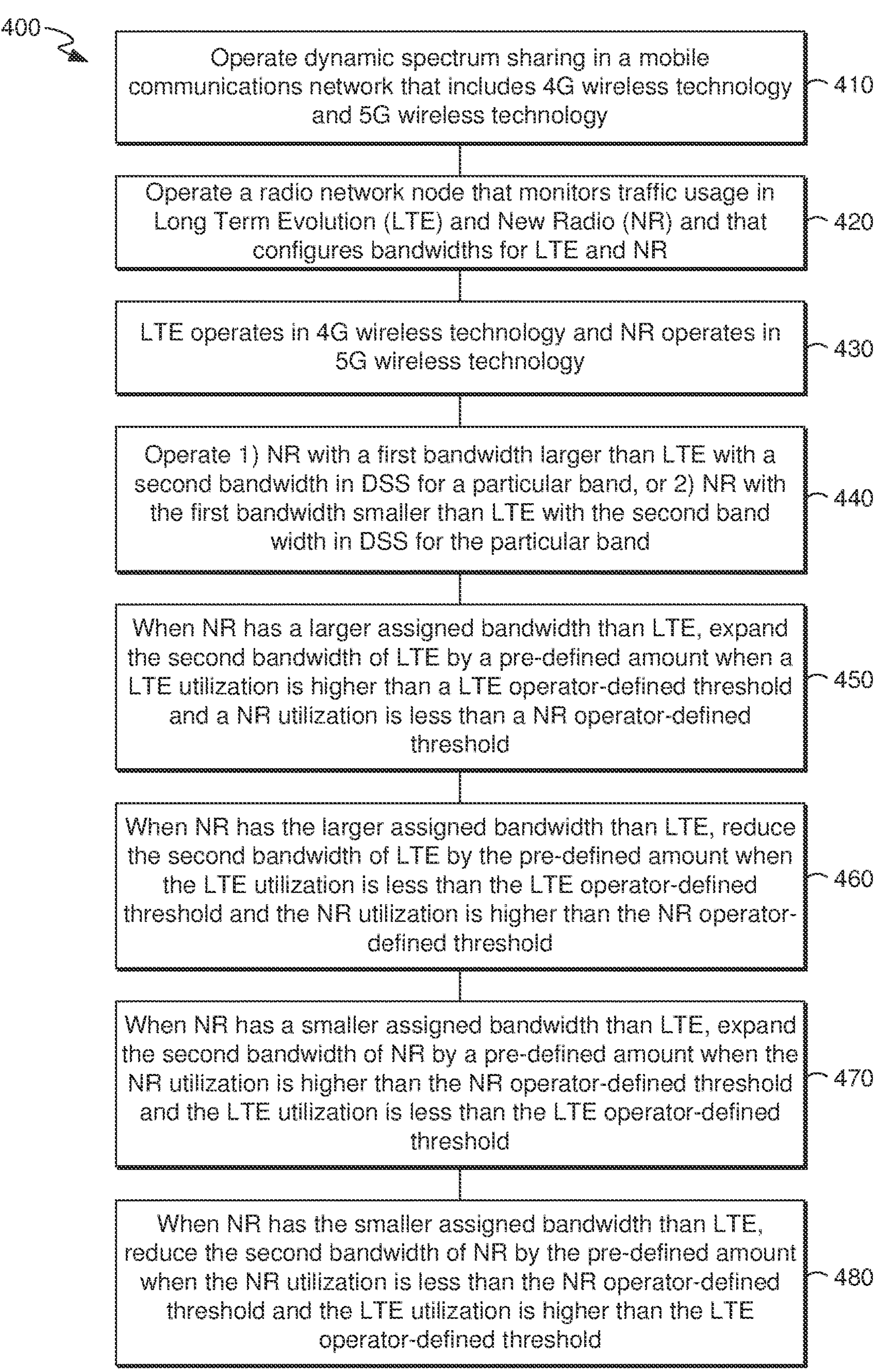
FIG. 4 illustrates another process for dynamically changing radio access technology (RAT) bandwidth based on traffic usage, according to an implementation of an embodiment of the present invention.

Turning now to FIG. 4, a method for dynamically changing radio access technology (RAT) bandwidth based on traffic usage is provided in a process 400. In a step 410, dynamic spectrum sharing (DSS) is provided in a mobile communications network that includes a 4G wireless technology and a 5G wireless technology. A radio network node monitors traffic usage in Long Term Evolution (LTE) (e.g. LTE 120, LTE 210) and New Radio (NR) (e.g. NR 110, NR 220) and configures bandwidths for LTE and NR, in a step 420. LTE operates in 4G wireless technology and NR operates in 5G wireless technology, in a step 430. In a step 440, NR has a first bandwidth that is larger than LTE with a second bandwidth for a particular band. Or, NR has the first bandwidth that is smaller than LTE with the second bandwidth for the particular band. When NR has a larger assigned bandwidth than LTE, the second bandwidth of LTE is expanded by a pre-defined amount when a LTE utilization is higher than a LTE operator-defined threshold and a NR utilization is less than a NR operator-defined threshold, in a step 450. In a step 460, When NR has the larger assigned bandwidth than LTE, the second bandwidth of LTE is reduced by the pre-defined threshold amount when the LTE utilization is less than the LTE operator-defined threshold and the NR utilization is higher than the NR operator-defined threshold. In a step 470, when NR has a smaller assigned bandwidth than LTE, the first bandwidth of NR is expanded by a pre-defined amount when the NR utilization is higher than the NR operator-defined threshold and the LTE utilization is less than the LTE operator-defined threshold. In a step 480, when NR has a smaller assigned bandwidth than LTE, the first bandwidth of NR is reduced by the pre-defined amount when the NR utilization is less than the NR operator-defined threshold and the LTE utilization is higher than the LTE operator-defined threshold.

The invention claimed is:

1. A method of dynamically changing a radio access technology (RAT) bandwidth based on traffic usage, comprising:

operating dynamic spectrum sharing (DSS) in a mobile communications network that includes a first wireless standard technology and a second wireless standard technology;

operating a radio network node that monitors traffic usage in a first RAT and a second RAT, wherein the first RAT operates in the first wireless standard technology and the second RAT operates in the second wireless standard technology;

operating the first RAT with a first bandwidth larger than the second RAT with a second bandwidth in DSS for a particular band;

receiving more than one operator-defined threshold including a first operator-defined threshold for the first bandwidth and separately a second operator-defined threshold for the second bandwidth;

expanding the second bandwidth of the second RAT by a pre-defined amount when a second RAT utilization is higher than the second operator-defined threshold and a first RAT utilization is less than the first operator-defined threshold; and reducing the second bandwidth of the second RAT by the pre-defined amount when the second RAT utilization is less than the second operator-defined threshold and the first RAT utilization is higher than the first operator-defined threshold, and wherein the first operator-defined threshold and the second operator-defined threshold are definable by an operator based on traffic usage.

2. The method of claim 1, wherein the radio network node is selected from a group comprising eNodeB, gNB, and ng-eNB.

3. The method of claim 2, wherein the first wireless standard technology is 5G wireless technology and the second wireless standard technology is 4G wireless technology.

4. The method of claim 3, wherein the first RAT is New Radio (NR) and the second RAT is Long Term Evolution (LTE).

5. The method of claim 2, wherein the first wireless standard technology is 4G wireless technology and the second wireless standard technology is 5G wireless technology.

6. The method of claim 5, wherein the first RAT is Long Term Evolution (LTE) and the second RAT is New Radio (NR).

7. A system for dynamically changing a radio access technology (RAT) bandwidth based on traffic usage, comprising:

a mobile communications network that is configured to operate dynamic spectrum sharing (DSS) that includes a first wireless standard technology and a second wireless standard technology;

a radio network node that is configured to operate and monitor traffic usage in a first RAT and a second RAT, wherein the first RAT operates in the first wireless standard technology and the second RAT operates in the second wireless standard technology;

the first RAT is configured to operate with a first bandwidth larger than the second RAT that is configured to operate with a second bandwidth, wherein the first RAT and the second RAT are configured to operate with DSS for a particular band;

the radio network node configured to receive more than one operator-defined threshold including a first operator-defined threshold for the first bandwidth and separately a second operator-defined threshold for the second bandwidth;

the radio network node is configured to expand the second bandwidth of the second RAT by a pre-defined amount when a second RAT utilization is higher than the second operator-defined threshold and a first RAT utilization is lower than the first operator-defined threshold; and the radio network node is configured to reduce the second bandwidth of the second RAT by the pre-defined amount when the second RAT utilization is lower than the second operator-defined threshold and the first RAT utilization is higher than the first operator-defined threshold;

wherein the first operator-defined threshold and the second operator-defined threshold are definable by an operator based on traffic usage.

8. The system of claim 7, wherein the radio network node is selected from a group comprising eNodeB, gNB, and ng-eNB.

9. The method of claim 8, wherein the first wireless standard technology is 5G wireless technology and the second wireless standard technology is 4G wireless technology.

10. The method of claim 9, wherein the first RAT is New Radio (NR) and the second RAT is Long Term Evolution (LTE).

11. The method of claim 8, wherein the first wireless standard technology is 4G wireless technology and the second wireless standard technology is 5G wireless technology.

12. The method of claim 11, wherein the first RAT is Long Term Evolution (LTE) and the second RAT is New Radio (NR).

13. A method of dynamically changing a radio access technology (RAT) bandwidth based on traffic usage, comprising:

operating dynamic spectrum sharing (DSS) in a mobile communications network that includes 4G wireless technology and 5G wireless technology;

operating a radio network node that monitors traffic usage in Long Term Evolution (LTE) and New Radio (NR) and that configures bandwidths for LTE and NR, wherein LTE operates in 4G wireless technology and NR operates in 5G wireless technology;

receiving more than one operator-defined threshold including a LTE operator-defined threshold and a NR operator-defined threshold;

1) Operating, when NR with a first bandwidth larger than LTE with a second bandwidth, in DSS for a particular band;

a) expanding the second bandwidth of LTE by a pre-defined LTE amount when a LTE utilization is higher than the LTE operator-defined threshold and a NR utilization is less than the NR operator-defined threshold, and b) reducing the second bandwidth of LTE by the pre-defined LTE amount when the LTE utilization is less than the LTE operator-defined threshold and the NR utilization is higher than the NR operator-defined threshold; or 2) Operating, when NR with the first bandwidth smaller than LTE with the second bandwidth, in DSS for the particular band;

a) expanding the first bandwidth of NR by a pre-defined NR amount when the NR utilization is higher than the NR operator-defined threshold and the LTE utilization is less than the LTE operator-defined threshold, and b) reducing the first bandwidth of NR by the pre-defined NR amount when the NR utilization is less than the NR operator-defined threshold and the LTE utilization is higher than the LTE operator-defined threshold;

wherein the NR operator-defined threshold and the LTE operator-defined threshold are definable by an operator based on traffic usage.

14. The method of claim 13, wherein the radio network node is selected from a group comprising eNodeB, gNB, and ng-eNB.

* * * * *